United States Patent
Kviatkovsky et al.

(10) Patent No.: US 11,734,949 B1
(45) Date of Patent: Aug. 22, 2023

(54) SYSTEM FOR BIOMETRIC IDENTIFICATION

(71) Applicant: AMAZON TECHNOLOGIES, INC., Seattle, WA (US)

(72) Inventors: Igor Kviatkovsky, Haifa (IL); Shunit Haviv, Haifa (IL); Manoj Aggarwal, Seattle, WA (US); Gal Novich, Ra'anana (IL); Gerard Guy Medioni, Los Angeles, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/210,170

(22) Filed: Mar. 23, 2021

(51) Int. Cl.
- *G06V 40/12* (2022.01)
- *G06T 7/73* (2017.01)
- *G06V 40/10* (2022.01)
- *G06V 40/13* (2022.01)

(52) U.S. Cl.
CPC ............ *G06V 40/1365* (2022.01); *G06T 7/74* (2017.01); *G06V 40/107* (2022.01); *G06V 40/117* (2022.01); *G06V 40/1318* (2022.01); *G06T 2207/30196* (2013.01)

(58) Field of Classification Search
CPC ............ G06V 40/1365; G06V 40/107; G06V 40/117; G06V 40/1318; G06T 7/74; G06T 2207/30196
See application file for complete search history.

(56) References Cited

U.S. PATENT DOCUMENTS

| | | | |
|---|---|---|---|
| 9,424,458 B1* | 8/2016 | Mather | G06T 7/11 |
| 2010/0045788 A1* | 2/2010 | Zhang | G06V 40/107 |
| | | | 382/116 |
| 2022/0012464 A1* | 1/2022 | Kim | G06N 3/08 |

OTHER PUBLICATIONS

Ilankumaran, et al., "Multi-Modal Palm Print and Finger Dorsal Biometric Authentication System using C2-based Fusion Algorithm", International Research Journal of Engineering and Technology (IRJET), vol. 7, Issue 3, Mar. 2020, pp. 2506-2512. Retrieved from the Internet: URL: https://www.irjet.net/archives/V7/i3/IRJET-V7I3498.pdf.

(Continued)

*Primary Examiner* — John B Strege
(74) *Attorney, Agent, or Firm* — Lindauer Law, PLLC

(57) ABSTRACT

Images of a hand are obtained by a camera. These images may depict the fingers and palm of the user. A pose of the hand relative to the camera may vary due to rotation, translation, articulation of joints in the hand, and so forth. One or more canonical images are generated by mapping the images to a canonical model. A first embedding model is used to determine a first embedding vector representative of the palm as depicted in the canonical images. A second embedding model is used to determine a set of second embedding vectors, each representative of individual fingers as depicted in the canonical images. Embedding distances in the embedding space from the embedding vectors to a closest match of previously stored embedding vectors are multiplied together to determine an overall distance. If the overall distance is less than a threshold value, an identity of a user is asserted.

20 Claims, 8 Drawing Sheets

(56) References Cited

OTHER PUBLICATIONS

Liliana, et al., "The combination of palm print and hand geometry for biometrics palm recognition", International Journal of Video & Image Processing and Network Security, IJVIPNS-IJENS, vol. 12, No. 1, Feb. 2012, pp. 1-5. Retrieved from the Internet: URL: https://www.ijens.org/Vol_12_I_01/122801-9494-IJVIPNS-IJENS.pdf.

Zhang, et al., "Palmprint Identification Integrating Left and Right by Local Discriminant Canonical Correlation Analysis", Journal of Computers, vol. 14, No. 9, Sep. 2019, pp. 580-589. Retrieved from the Internet: URL: http://www.jcomputers.us/vol14/jcp1409-03.pdf.

* cited by examiner

SYSTEM FOR BIOMETRIC IDENTIFICATION

BACKGROUND

A camera may acquire images of a portion of a user, such as a hand, that is used for biometric identification.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
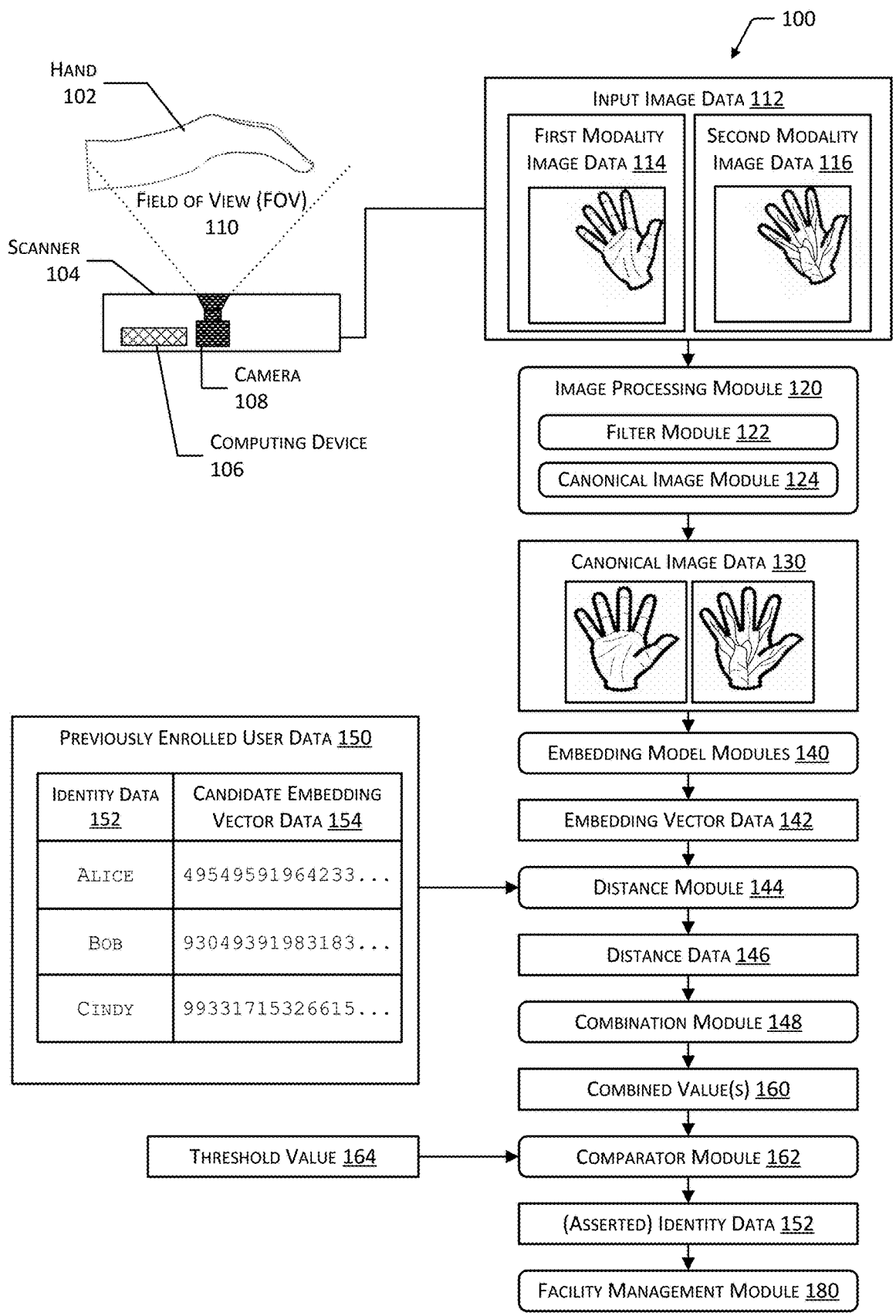
FIG. 1 illustrates a system to determine an identity of a user using multimodal images of their hand, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Accurate and fast identification of a user provides useful information that may be used in a variety of ways. For example, entry to a material handling facility (facility), office, transportation facility, or other location may be controlled based on user identity. As the user enters the facility, they may be identified using the devices and techniques described herein. In another example, user identity may be used to assert payment for goods or services at a point of sale.

Traditional systems for identifying users suffer from several significant drawbacks including susceptibility to fraud, as well as speed, accuracy, and operational limitations. For example, a traditional system to identify a user by presenting a token, such as an identification card, may be used by someone other than an authorized user. As a result, systems that involve only the use of "something you have" are vulnerable to misuse. Biometric identification systems deal with this by using a characteristic of the particular individual that is difficult or impossible to copy or be transferred.

Biometric identification systems that use biometric features present on a finger or palm may require physical contact between the user's hand and a scanning device. This physical contact may be deemed unsanitary and may be difficult to accomplish for some users. Users may also hold their hands in various configurations, positions, alignments, and so forth. For example, one user may spread their fingers and hold their hand centered on the scanning surface while another user may have their fingers closed and have the palm off center. The complexity of attempting to assert an identity increases when there is no contact surface to otherwise constrain the pose of the hand relative to a camera. For example, a user holding their hand over a scanning device that includes an upward facing camera may have their palm tilted at various angles, finger joints may be bent, distance from the camera may change, and so forth. Due to the additional degrees of freedom that are provided to the unconstrained hand, the input image produced by this type of system may exhibit even greater variability than the scanning device that involves a hand coming into contact with a guide or window device. If unaccounted for, this variability can also reduce overall accuracy of the identification from the input image.

Traditional systems may only use data from a particular portion of the hand, such as only fingerprints, only palmprints, and so forth. However, these systems typically require a fixed constraint, such as a touch plate or guide, to acquire sufficient data. Changes in pose, misalignments, or other situations that result in the particular portion of the hand not being suitably visible can prevent these traditional systems from operating. The reliance on features of only a particular portion of the hand also reduces the confidence in the identity asserted.

Described in this disclosure are techniques and systems to determine an identity that is associated with a hand of a user that is presented to a scanner. Information about several portions of the hand is combined and used to assert an identity of a previously enrolled user. A first set of query images are acquired using a scanner. These query images may be acquired using a first modality and a second modality. For example, the images acquired using the first modality may depict surface features of the hand while images acquired using the second modality depict subcutaneous features.

The first set of images may be processed to produce one or more canonical images. For example, an input image of a hand in a given pose as acquired by an upward facing camera would be remapped into a canonical image in which the hand appears in a standardized pose of palm down with fingers straight and spread out relative to one another. The resulting canonical image may then be processed to determine if there is a match to a candidate in previously enrolled user data. If a match is found, the identity of the candidate may be asserted to the user.

The query canonical image data includes various portions that are associated with particular areas of the hand. For example, the query canonical image may be divided into six portions: palm, first finger, second finger, third finger, fourth finger, and fifth finger. Likewise, a candidate canonical image may be divided into the same portions.

Each portion of a canonical image is processed to determine an embedding vector that is representative of the features depicted in that portion. In one implementation, a first embedding model may be used to process portions associated with palms and determine corresponding embedding vectors, and a second embedding model may be used to determine embedding vectors for each of the fingers. The query set of embedding vectors representative of the images of the user's hand at the scanner are then compared with corresponding candidate embedding vectors.

During an enrollment process, the user opts in and presents their hand to the scanner. The resulting one or more of the image data or candidate set of embedding vectors may be stored for later comparison. While attempting to determine identity, a comparison is made between the query set of embedding vectors and the candidate set of embedding vectors.

For each candidate identity, a pairwise distance is determined between a query embedding vector and a corresponding candidate embedding vector. This distance is represented within the embedding space associated with the embedding model used. In one implementation, a query first modality canonical image and a query second modality canonical image, each with six portions, would result in 12 query embedding vectors. Each of these query embedding vectors are compared to corresponding candidate embedding vectors. A distance is determined for each of these pairs, resulting in 12 distances D1, D2, . . . , D12 for each modality. In implementations where two modalities are used, 24 distances are determined. The distances are processed to determine a combined value. In one implementation, the distances may be multiplied together to calculate the combined value.

The combined values for a plurality of candidates are compared to one another. The lowest combined value may be deemed to be associated with the identity of the user. In some implementations the lowest combined value may be compared to a threshold value. For example, if the lowest combined value is less than the threshold value, the identity associated with the lowest combined value may be asserted, and the user may be deemed to be identified. In comparison, if the lowest combined value is greater than the threshold value, the identity associated with the lowest combined value may not be asserted, and the user may be deemed to be unidentified.

Scanners may be placed at one or more of entrances to the facility, exits from the facility, or designated areas within the facility such as a point of sale. The input images from these scanners may be processed to provide canonical images. The canonical images may then be processed to determine identification data indicative of the identity of the user who has presented their hand to the scanner. The process described herein may also be used to process other biometric data, such as images of a face.

Information about the identity of the user may also be used to associate particular actions made by that particular user with an associated account. The facility may include, or have access to, a facility management system. The facility management system may be configured to maintain information about items, users, condition of the facility, and so forth based at least in part on sensor data obtained by one or more sensors such as weight sensors, cameras, and so forth, in the facility and may be used to determine interaction data.

The interaction data may include information about a type of item involved in an interaction, quantity involved in the interaction, whether the interaction was a pick or place, who performed the interaction, and so forth. Interactions may include the user picking an item from an inventory location, placing an item at the inventory location, touching an item at the inventory location, rummaging through items at the inventory location, and so forth. For example, the facility management system may generate interaction data that indicates what item the user picked from a particular lane on a shelf, and then use this interaction data to adjust the count of inventory stowed at that lane.

This interaction data may then be associated with the particular user who has been previously identified, and subsequently used for billing or other purposes. For example, the interaction data and identification data may be used to bill an account associated with the identified user for the item that was picked. This improves the security afforded to the user, eliminates the need for potentially unsanitary physical contact, and also improves the convenience to the user and the operator of the facility.

Illustrative System

FIG. 1 illustrates a system 100 to determine identity of a user. A hand 102 of a user is depicted positioned above a scanner 104. The scanner 104 may include a computing device 106 and a camera 108. The camera 108 has a field of view (FOV) 110. During operation of the scanner 104, the camera 108 acquires images of an object in the FOV 110, such as the hand 102, and provides input image data 112. The scanner 104 may include other components which are not shown. For example, the scanner 104 may include lights that illuminate the object in the FOV 110.

In the implementation depicted, the hand 102 is held above the camera 108, with the FOV 110 extending upward. In other implementations, other configurations may be used. For example, the camera 108 may have the FOV 110 extending downwards, and the user may place their hand 102 in the FOV 110 under the scanner 104.

In one implementation the scanner 104 is configured to acquire images of the hand 102 that are illuminated using infrared light that has two or more particular polarizations, with different illumination patterns, and so forth. For example, during operation the user may present their hand 102 with the palm or volar region of the hand toward the scanner 104. As a result, the input image data 112 provides an image of the anterior portion of the hand 102. In other implementations, the input image data 112 may include the back of the hand 102. Separate images may be acquired using different combinations of polarized light provided by the infrared lights.

Depending upon the polarization used, the images produced by the scanner 104 may be of first modality features or second modality features. The first modality may utilize images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include surface features such as creases, wrinkles, scars, dermal papillae ridges, and so forth in at least the epidermis of the hand 102.

Second modality features comprise those features that are below the epidermis. The second modality may utilize images in which the hand 102 is illuminated with light having a second polarization and obtained by the camera 108 with the polarizer passing light to the camera 108 with the first polarization. For example, the second modality features may include subcutaneous anatomical structures such as veins, bones, soft tissue, and so forth. Some features may be visible in both first modality and second modality images. For example, a crease in the palm may include first modality features on the surface as well as deeper second modality features within the palm.

Separate images of the first and second modalities may be acquired using different combinations of polarized light provided by infrared lights. In this illustration, the input image data 112 comprises first modality image data 114 and second modality image data 116. The first modality image data 114 and the second modality image data 116 of the same image may be acquired in rapid succession with respect to one another. For example, the camera 108 may operate at 60 frames per second and acquire the first modality image data 114 in a first frame and the second modality image data 116 in a second frame.

The user may place their hand 102 within the FOV 110 in various poses, distances, translations, and so forth. The pose of the hand 102 may indicate the rotation of the hand 102 relative to the camera 108 and the articulation of the joints in the hand 102. For example, the pose may be that the hand 102 is rotated with a yaw of −2 degrees, pitch of +5 degrees, and roll of −7 degrees and an articulation in which the fingers are together. The distance may comprise the distance between the camera 108 and the hand 102. For example, the distance may vary from zero in which the hand 102 is in contact with the scanner 104 to several meters in which the hand 102 is too far away for a useful image to be acquired. The translation indicates the translation or apparent position of the hand 102 in a plane that is perpendicular to an optical axis extending away from the camera 108. For example, if the hand 102 is not centered directly above the camera 108, the resulting input image data 112 may show the hand 102 to be translated away from the center of the input image.

In the implementation depicted here, the scanner 104 does not include a guide, scan plate, or other structure that constrains the pose or position of the hand 102. For example, the user may move their hand 102 within the FOV 110 freely, rotating, translating, changing articulation, and so forth without constraint. As a result, the appearance of the hand 102 in the input image data 112 may vary considerably due to changes in articulation, pose, distance, translation, and so forth. The omission of the guide may improve sanitary operation of the system. For example, by removing the guide, the user's hand 102 does not come into physical contact with a structure, eliminating the possibility of contact transmission of contaminants, disease, and so forth. By removing the physical contact, the need for surface cleaning of the guide between users may be eliminated.

In another implementation, the scanner 104 may include a structure such as a guide or scan plate to constrain at least some movement of the hand 102. For example, the scan plate may comprise a flat pane of glass which the hand 102 may rest upon, and the camera 108 may then acquire an image. However, even in the situations involving the guide, the user 102 may not be fully constrained. For example, the user may place their hand 102 in different articulations such as fingers together, fingers apart, and so forth. The user may also fail to place their hand 102 in the preferred position with regard to the guide, for example only having an edge of their hand 102 in contact with the scan plate while the rest is elevated producing a rotation of the hand 102 with respect to the camera 108. As a result, the input image data 112 may vary considerably, even with the structure to guide the user's hand 102.

An image processing module 120 may receive the input image data 112 and perform additional processing. For example, a filter module 122 of the image processing module 120 may apply one or more filters to the input image data 112. In another example, the image processing module 120 may align the first modality image data 114 and the second modality image data 116. This alignment may include one or more of rotation or translation of a portion of the images.

The image processing module 120 may comprise a canonical image module 124. For example, the canonical image module 124 may accept as input the input image data 112 and provide as output canonical image data. In some implementations the canonical image module 124 may comprise a neural network that has been trained to generate canonical image data as output. The canonical image data represents the input image data 112 with one or more of a predetermined pose relative to the camera 108 of the scanner 104, predetermined articulation of the hand 102, predetermined illumination, predetermined scale, or other characteristic. For example, the input image data 112 may depict the hand 102 of the user slightly tilted and off-center relative to the FOV 110, with the fingers together. The canonical image data may depict the same hand 102 in a canonical pose with no tilt and centered in the image, a canonical articulation in which the fingers are splayed apart, and so forth.

The canonical image module 124 may comprise a plurality of neural networks. For example, the canonical image module 124 may use convolutional neural networks in a pyramid scene parsing network configuration. These neural networks may be trained to perform the functions used to determine the canonical image data 130. In one implementation, the canonical image module 124 may map at least a portion of the input image data 112 to a predetermined canonical model. For example, texture mapping techniques may be used to map data from the input image data 112 to a three-dimensional model of a canonical hand in a canonical pose.

In some implementations the image processing module 120 may perform other operations. For example, the filter module 122 may apply one or more filters to the canonical image data 130.

The canonical image data 130 is processed by one or more embedding model modules 140 to determine embedding vector data 142. The embedding model module 140 may comprise one or more neural networks that have been trained to determine the embedding vector data 142 that is representative of, or based on, features present in the canonical image data 130. As described herein, the embedding model module 140 may be trained to process a particular portion of the hand 102, operate on a particular modality of image data, and so forth. For example, a first embedding model module 140(1) may be trained to process a palm portion of first modality canonical image data 130 while a second embedding model module 140(2) is trained to process the palm portion of second modality canonical image data 130.

In some implementations the canonical image module 124 may be omitted. For example, the first modality image data 114 and the second modality image data 116 may be processed by the filter module 122, and the resulting output processed by the embedding model module(s) 140 to determine the embedding vector data 142.

During an enrollment process, the user may opt in to use the system 100 and presents their hand 102 to produce input image data 112. The input image data 112 may be assessed for factors that affect quality of the input, such as blurriness, overexposure, underexposure, and so forth. For example, if input image data 112 is deemed to be blurry, a request may be made for the user to present their hand 102 again to acquire non-blurry input image data 112. Previously enrolled user data 150 may be stored that comprises one or more of the input image data 112, the canonical image data 130, associated embedding vector data 142, name, or additional information. For example, the additional information may comprise name, contact information, demographic data, payment account information, and so forth. The embedding vector data 142 may act as a "signature" that is uniquely associated with the identity of the user. During the enrollment process, the submitted embedding vector data 142 may be checked to determine whether the user has been previously enrolled. A successful enrollment may comprise storage of identity data 152, such as name, telephone number, account number, and so forth and storage of the embedding vector data 142 as candidate embedding vector data 154.

During subsequent usage, the (as yet unidentified) user presents their hand 102 at the scanner 104, The resulting (query) input image data 112 may be processed by at least a portion of the embedding model module(s) 140 to determine a set of embedding vector data 142. The embedding vector data 142 may be compared to the candidate embedding vector data 154 in the previously enrolled user data 150, as described herein.

While attempting to determine the identity associated with (query) canonical image data 130, information about one or more candidates are retrieved from previously enrolled user data 150. A distance module 144 determines a set of distance data 146. The set of distance data 146 comprises distance values indicative of respective distances in respective embedding spaces between the embedding vector data 142 of the query input image data 112 and candidate embedding vector data 154. Distance data 146 is determined for each candidate. The determination of distance data 146 is discussed in more detail with regard to FIG. 2.

The distance data 146 is provided to a combination module 148 that determines a combined value 160 for each candidate. For example, the distance data 146 may comprise a set of distance values, each indicating a distance in a respective embedding space between a feature vector of the embedding vector data 142 and a feature vector of the candidate embedding vector data 154. In one implementation, the combination module 148 may calculate the combined value 160 by multiplying all of the distance values that are associated with a single candidate. In other implementations, other operations may be used to determine the combined value 160. Operation of the combination module 148 is discussed in more detail below with regard to FIG. 4.

The combined value(s) 160 are provided to a comparator module 162 that determines (asserted) identity data 152. Each of the combined values 160 is associated with different candidate embedding vector data 154. Each of the different candidate embedding vector data 154 is associated with a different identity, as indicated by the identity data 152. In one implementation, the comparator module 162 may select a lowest or least combined value 160. If the selected combined value 160 is less than a threshold value 164, the comparator module 162 may assert the identity data 152 that is associated with the selected combined value 160. For example, the threshold value 164 may specify a combined value 160 that is deemed too large to produce an accurate assertion of identity. Combined values 160 greater than this threshold value 164 may be deemed to represent comparisons between query input image data 112 and previously enrolled user data 150 that is too dissimilar. The threshold value 164 may be a fixed value or may comprise a variable function. For example, the fixed value may be determined based on testing. The comparator module 162 is discussed in more detail with regard to FIG. 4.

In some implementations, additional data may be associated with the asserted identity data 152. For example, the asserted identity data 152 may provide information such as one or more of a user identifier associated with the user, a location or identification of the scanner 104, data indicative of date and time that the input image data 112 was obtained, and so forth.

The asserted identity data 152 determined by the comparator module 162 may be subsequently used for various purposes. For example, if the asserted identity data 152 has been granted access to the facility, a command may be issued to open a gate or door so the user may enter the facility. In another example, the asserted identity 152 may be used to access electronic resources. In another example, the asserted identity 152 may be used to indicate an intent and authorization to pay.

In the example depicted here, the asserted identity data 152 may be passed to a facility management module 180. The facility management module 180 may use the asserted identity data 152 to associate an identity with that user as they move about the facility. For example, the facility management module 180 may use data from cameras or other sensors in the physical space to determine a location of the user. Given a known path of the user from the gate, the user identity indicated in the asserted identity data 152 may be associated with the user as they use the facility. For example, the now identified user may walk to a shelf, remove an item, and leave the facility. The facility management module 180 may determine the interaction data indicative of the removal of the item as being associated with the user identifier specified in the (asserted) identity data 152, and bill an account associated with the user identifier.

These techniques may be used to process other biometric data as well. In one implementation, the input image data 112 may comprise images of a face or portion thereof. A canonical image of the face may be provided and processed with different portions of the face. For example, a first embedding model module 140 may be trained to process a portion of the canonical image of the face that depicts an eye, a second embedding model module 140 may be trained to process a portion of the canonical image of the face that depicts a nose, and so forth. The techniques may utilize data from additional modalities, such as point cloud data. For example, a camera may utilize structured light, time of flight, lidar, or other techniques to determine information about a location of various points in three-dimensional space. This data may be used as a modality that is processed as discussed herein.

Figure 2:
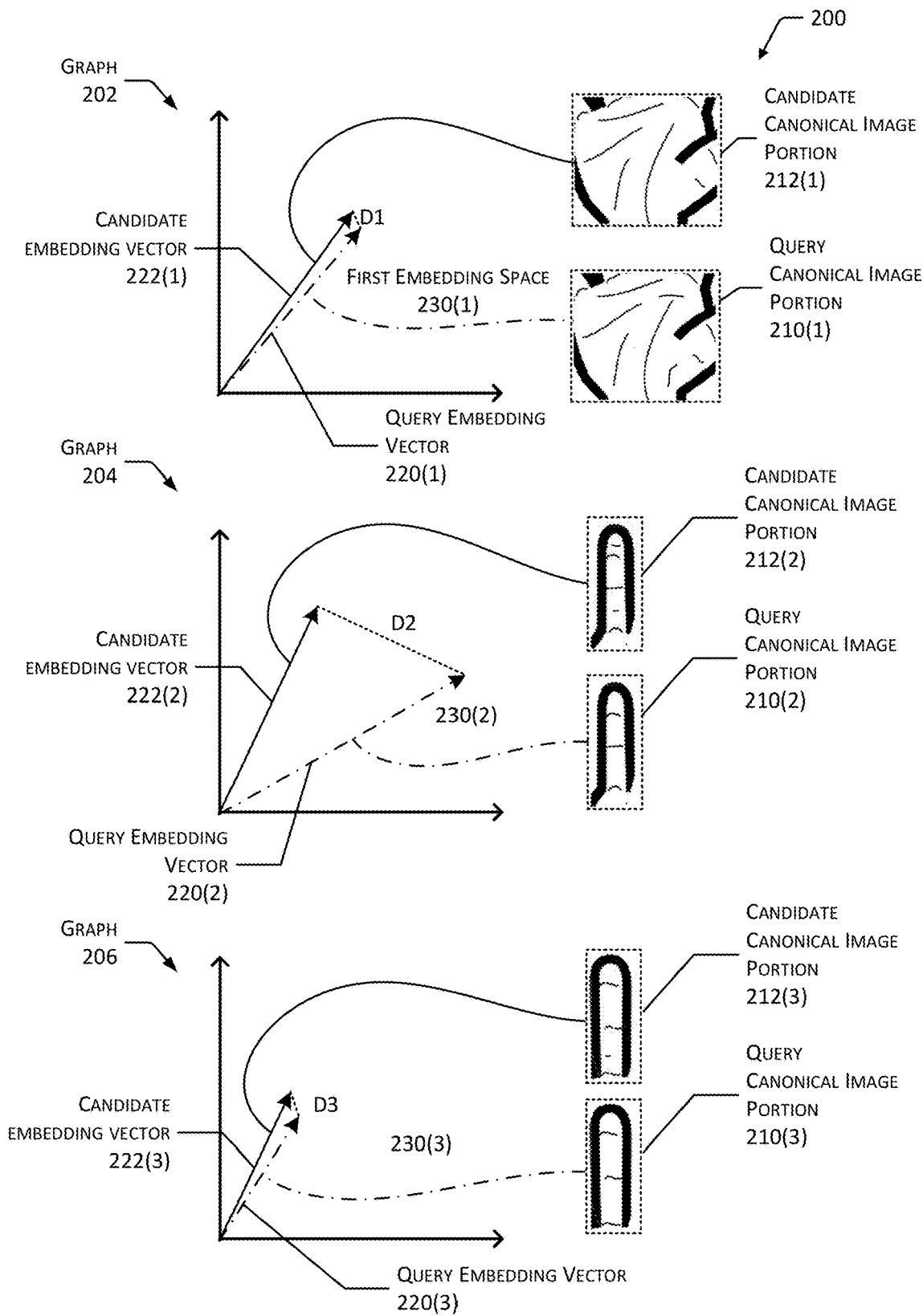
FIG. 2 illustrates distances, in embedding spaces, of embedding vectors representing different portions of the user's hand and previously stored candidate embedding vectors, according to some implementations.

FIG. 2 illustrates at 200 graphs 202, 204, and 206 of distances, in embedding spaces, of embedding vectors representing different portions of the user's hand and previously stored candidate embedding vectors, according to some implementations. The distance data 146 may comprise these distances. The distance data 146 is then used to determine the (asserted) identity data 152.

At graph 202 a first embedding space 230(1) is shown. The embedding spaces 230 herein are depicted as two-dimensional by way of illustration and not as a limitation.

The embedding spaces 230 may be n-dimensional. Each of the embedding spaces 230 may have different dimensionality. For example, the first embedding space 230(1) may have 347 dimensions, the second embedding space 230(2) may have 127 dimensions.

Within the first embedding space 230(1) a query embedding vector 220(1) and a candidate embedding vector 222(1) are shown. The query embedding vector 220(1) is representative of, or otherwise associated with, a query canonical image portion 210(1), such as the portion of the canonical image data 130 shown here that depicts the palm of the user. Similarly, the candidate embedding vector 222(1) is representative of, or otherwise associated with, a candidate canonical image portion 212(1) that is associated with the same portion, such as the palm of the candidate. A distance D1 is determined between the query embedding vector 220(1) and the candidate embedding vector 222(1).

The graph 204 shows a second embedding space 230(2). A query embedding vector 220(2) and a candidate embedding vector 222(2) are shown. The query embedding vector 220(2) is representative of, or otherwise associated with, a query canonical image portion 210(2), such as the portion of the canonical image data 130 shown here that depicts an index finger of the user. Similarly, the candidate embedding vector 222(2) is representative of, or otherwise associated with, a candidate canonical image portion 212(2) that is associated with the same portion, such as the index finger of the candidate. A distance D2 is determined between the query embedding vector 220(2) and the candidate embedding vector 222(2).

The graph 206 shows a third embedding space 230(3). A query embedding vector 220(3) and a candidate embedding vector 222(3) are shown. The query embedding vector 220(3) is representative of, or otherwise associated with, a query canonical image portion 210(3), such as the portion of the canonical image data 130 shown here that depicts an index finger of the user. Similarly, the candidate embedding vector 222(3) is representative of, or otherwise associated with, a candidate canonical image portion 212(3) that is associated with the same portion, such as the index finger of the candidate. A distance D3 is determined between the query embedding vector 220(3) and the candidate embedding vector 222(3).

Figure 3A:
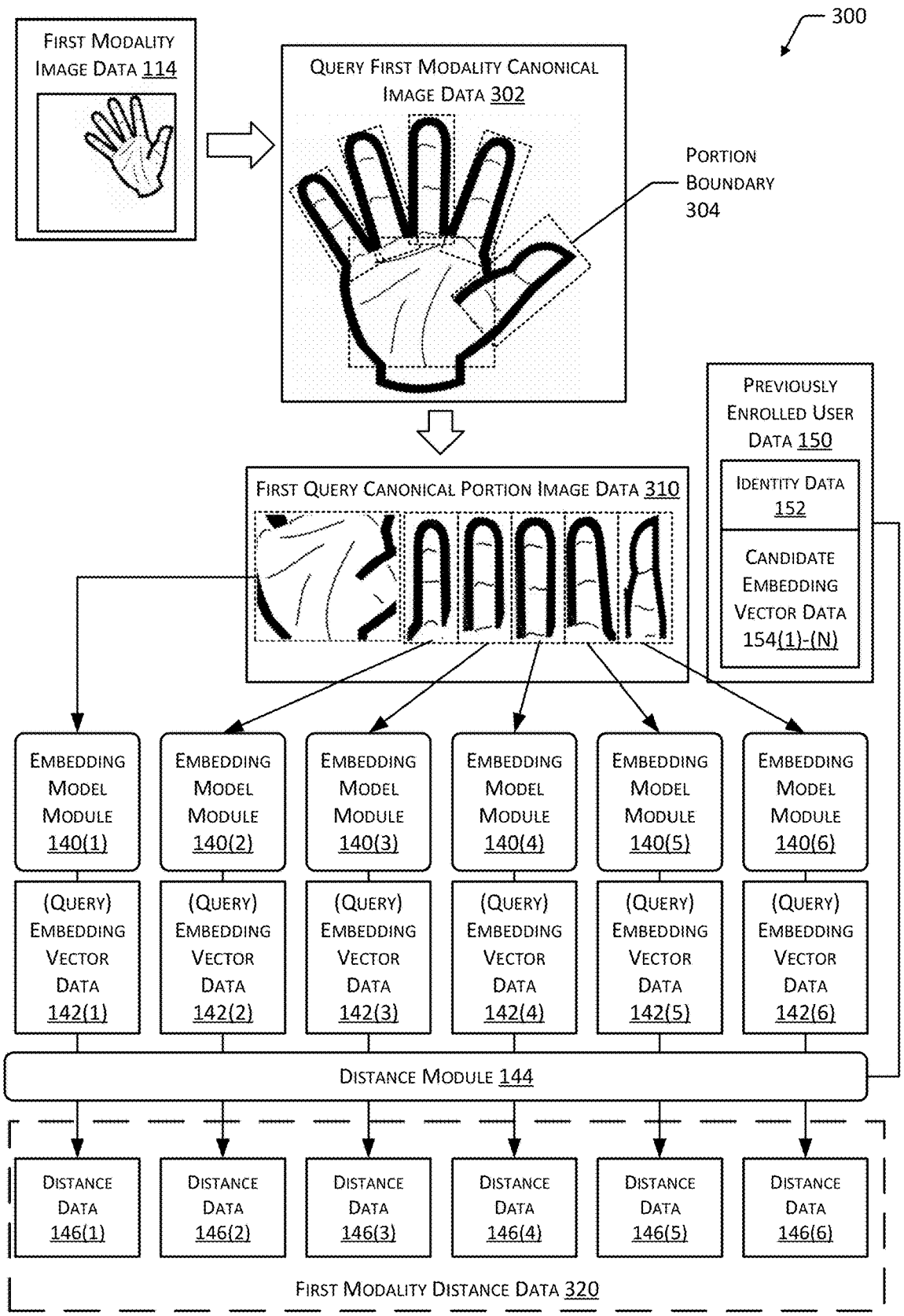
FIGS. 3A and 3B depict determination of distance data in embedding spaces for the multimodal images of the user's hand relative to embedding vectors of a candidate identity, according to some implementations.
Figure 3B:
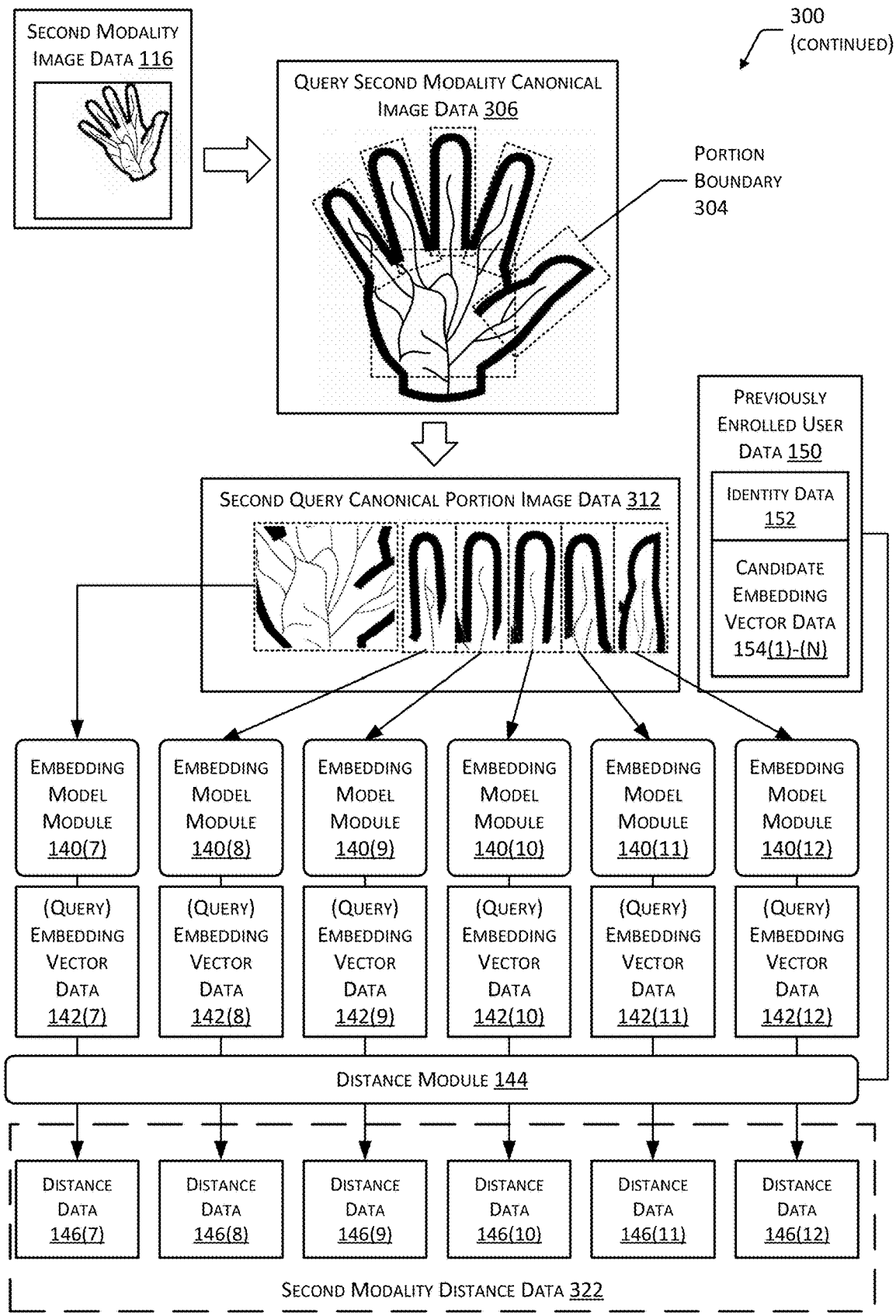

FIGS. 3A and 3B depict at 300 determination of distance data 146 in embedding spaces 230 for the multimodal images of the user's hand 102 relative to embedding vectors of a candidate identity, according to some implementations.

The input image data 112 is obtained of a query hand that is to be identified. As described above, the input image data 112 may include first modality image data 114 and second modality image data 116. For example, the first modality image data 114 depicts surface features while the second modality image data 116 depicts subcutaneous features.

Based on the input image data 112, the image processing module 120 produces canonical image data 130 that includes query first modality canonical image data 302 shown in FIG. 3A, and query second modality canonical image data 306 shown in FIG. 3B. As described above, the canonical image data 130 may present the input image data 112 with the hand 102 depicted therein arranged in a canonical pose with no tilt and centered in the image, a canonical articulation in which the fingers are splayed apart, and so forth.

Portion boundaries 304 are depicted as dotted lines. The portion boundaries 304 delineate particular portions of the canonical image data 130 that will be processed as described below. The portion boundaries 304 may or may not be mutually exclusive. In the implementation depicted here, the portion boundaries 304 exhibit some overlap. For example, the portion corresponding to the palm may include or overlap one or more portions that correspond to a finger.

The canonical image module 124 may process the query first modality canonical image data 302 to determine first query canonical portion image data 310. The canonical image module 124 may extract or otherwise determine the portions of the query first modality canonical image data 302 that are associated with the respective portions as specified by the portion boundaries 304. For example, the first query canonical portion image data 310 depicts the canonical views of the palm, and the fingers consisting of the fourth (pinkie) finger, third (ring) finger, second (middle) finger, first (index) finger, and thumb.

One or more embedding model modules 140(1), . . . , 140(P) may be used to process the portions in the first query canonical portion image data 310. In the implementation shown here, the portion associated with the palm may be processed by a first embedding model module 140(1) to determine (query) embedding vector data 142(1). For example, the first embedding model module 140 may implement an embedding model that has been trained to process palm portions of image data in a particular modality, such as the first modality shown here.

In the implementation shown here, portions of the first query canonical portion image data 310 corresponding to each of the fingers (including the thumb) are each processed by respective embedding model modules 140(2)-(6) to determine corresponding (query) embedding vector data 142(2)-(6). In one implementation, the non-palm portions may be processed using the same embedding model module 140. For example, an embedding model module 140 may be trained to determine embedding vector data 142 of portions corresponding to fingers. In this implementation, the same query embedding model module 140(2), or copies thereof, may be used to determine the (query) embedding vector data 142(2)-(6). For example, the same query embedding model module 140(2) may be used to process the portions corresponding to fingers to determine (query) embedding vector data 142(2)-(6).

During a training phase, the respective embedding model modules 140 are trained to determine their respective embedding models. This training process may be supervised, unsupervised, and may use actual data obtained from users, synthetic data, or a combination thereof. The embedding model modules 140 may utilize convolutional neural networks or other machine learning techniques.

After processing by the embedding model modules 140, the set of (query) embedding vector data 142(1)-(6) are provided to the distance module 144. The distance module 144 also accepts as input the candidate embedding vector data 154 of the previously enrolled user data 150 that is associated with the candidate identity being assessed. For example, candidate embedding vector data 154(1)-(6).

The distance module 144 determines distance data 146(1)-(6) that is indicative of the respective distances, in the respective embedding spaces 230, between the (query) embedding vector data 142 and the corresponding candidate embedding vector data 154. For example, the distance data 146(1) indicates the distance D1 in the first embedding space 230(1) between the query embedding vector 220(1) of the (query) embedding vector data 142(1) and the candidate embedding vector 222(1) of the candidate embedding vector data 154(1) of the palm portion. Likewise, the distance data 146(2) indicates the distance D2 associated with the fourth (pinkie) finger portion, the distance data 146(3) indicates the distance D3 associated with the third (ring) finger portion, and so forth.

The set of distance data 146(1)-(6), that is based on the first modality image data 114 may be designated as first modality distance data 320, as shown here. FIGS. 3A and 3B depict processing of six portions: palm, and five fingers (including the thumb). In other implementations other portion boundaries 304 may be used. For example, the portions may comprise central palm, outer palm, and fingers. In another example, the portions may comprise a first portion including first and fourth fingers, a second portion including the thumb, and a third portion including the palm.

FIG. 3B depicts processing that is similar to that described above with regard to FIG. 3A except the second modality is used. The second modality image data 116 is processed to determine the query second modality canonical image data 306. The query second modality canonical image data 306 is processed to determine second query canonical portion image data 312. The respective portions of the second query canonical portion image data 312 are processed by respective embedding model modules 140(7)-(12) to determine corresponding (query) embedding vector data 142(7)-(12). The (query) embedding vector data 142(7)-(12) is provided to the distance module 144 along with corresponding candidate embedding vector data 154, such as candidate embedding vector data 154(7)-(12). The distance module 144 provides as output distance data 146(7)-146(12). The set of distance data 146(7)-(12), that is based on the second modality image data 116 may be designated as second modality distance data 322, as shown here.

The system 100 now has first modality distance data 320 and second modality distance data 322 that is representative of the distances in respective embedding spaces 230 between the input image data 112 of a query hand and a candidate identity in the previously enrolled user data 150. This data may be used by the combination module 148 to determine the combined value 160 and determine if an identity is able to be asserted, as described in FIG. 4.

In some implementations the determination of the distance data 146, such as illustrated in FIGS. 3A and 3B, using the input image data 112 and the use of the canonical image data 130 may be omitted. For example, the portions of the hand 102 may be determined by processing the input image data 112. Those portions may then be processed using the respective embedding model modules 140 to determine corresponding (query) embedding vector data 142.

The techniques described herein may be used to process other biometric data. For example, the input image data 112 may depict a user's face. The canonical image data 130 may comprise a canonical representation of the face, with the portion boundaries 304 specifying different portions of the face such as forehead, eye, nose, mouth, chin, cheeks, and so forth. As described, specified embedding model modules 140 may then be used to process and determine (query) embedding vector data 142 associated with the respective portion of the face.

Figure 4:
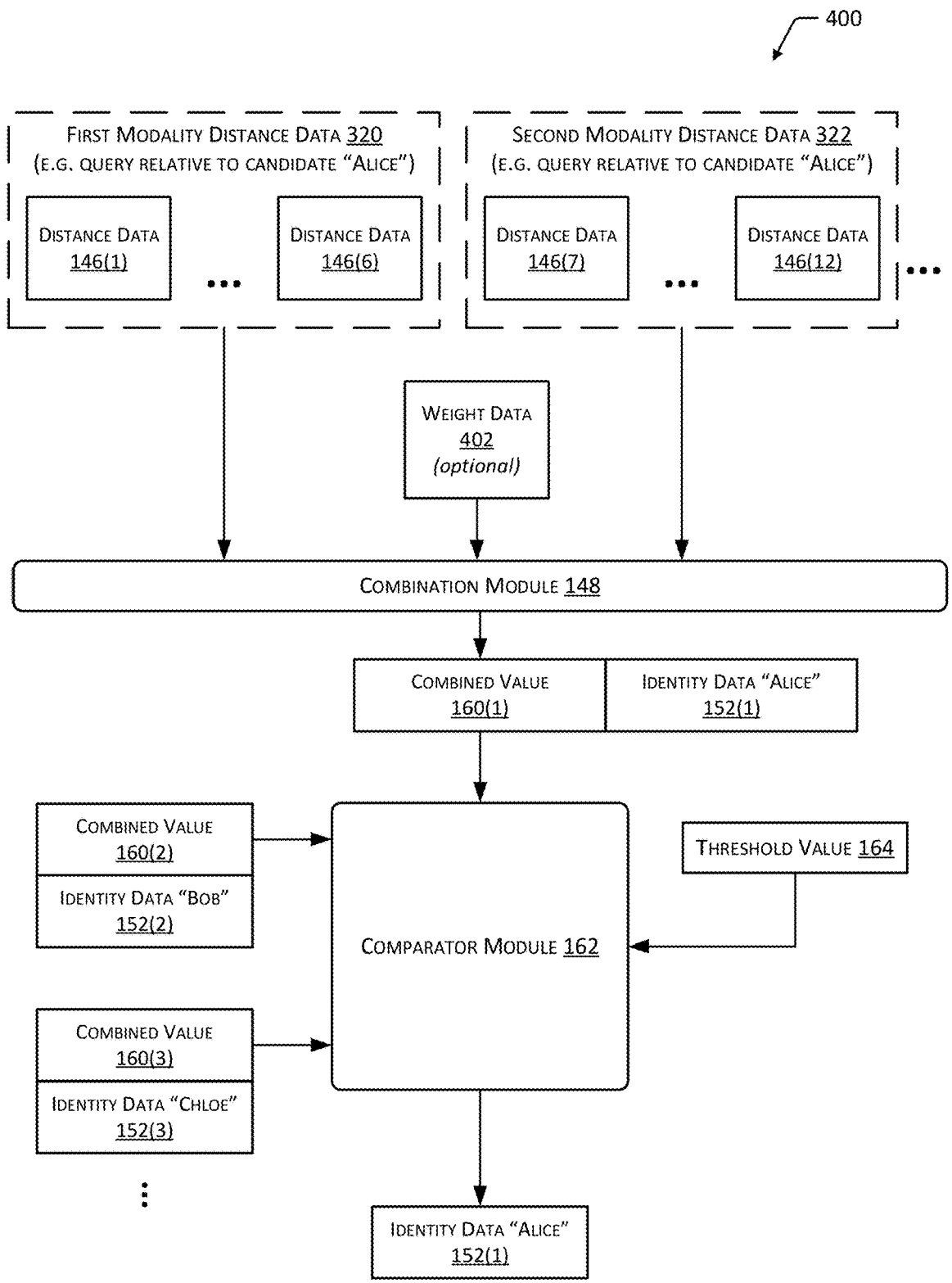
FIG. 4 depicts processing of the distance data to determine identity data to be associated with the user, according to some implementations.

FIG. 4 depicts at 400 processing of the distance data 146 to determine identity data 152 to be associated with the user, according to some implementations. The combination module 148 accepts as input the first modality distance data 320, the second modality distance data 322, and other modality distance data if available. While two modalities are depicted, additional modalities may be included. For example, a third modality may comprise image data acquired using one or more ultraviolet wavelengths, thermal imaging, point cloud data, and so forth.

The combination module 148 may perform one or more operations to determine the combined value 160. In one implementation, the values of the distance data 146 provided as input to the combination module 148 may be multiplied together. For example, in the implementation shown in FIGS. 3A and 3B where the distance data 146 comprises 12 distance values D1, D2, . . . , D12, the combined value 160 may be calculated as:

Combined Value=$D1*D2*D3*D4*D5*D6*D7*D8*D9*D10*D11*D12$ (Equation 1)

In other implementations, other operations may be performed. For example, weight data 402 may be used to apply a weight value to one or more of the respective values of the distance data 146 and determine intermediate distances. For example, the combined value 160 may be calculated as product of intermediate distances:

Combined Value=$(D1*W1)*(D2*W2)*(D3*W3)*(D4*W4)*(D5*W5)*(D6*W6)*(D7*W7)*(D8*W8)*(D9*W9)*(D10*W10)*(D11*W11)*(D12*W12)$ (Equation 2)

Use of the weight data 402 comprising weight values allows tuning of consideration of particular portions of the hand 102. For example, features depicted in the palm may be allocated increased weight by using a weight value greater than 1, while features depicted in the fourth (pinkie) finger may be allocated decreased weight by using a weight value less than 1.

In some implementations the weight data 402 may be used to weight distance data 146 associated with a particular modality. For example, a first weight value may be used to modulate the first modality distance data 320, a second weight value may be used to modulate the second modality distance data 322, a third weight value may be used to modulate a third modality distance data, and so forth.

The system 100 may generate one or more combined values 160(1), . . . , 160(Q), each representative of a comparison between a user who provided the input image data 112 and previously enrolled user data 150 for a particular candidate identity. In FIG. 4, the comparator module 162 receives combined values 160(1), 160(2), and 160(3) that are associated with identity data 152(1), 152(2), and 152(3), respectively. The comparator module 162 may also accept as input the threshold value 164. The threshold value 164 may specify a maximum combined value 160 that is deemed acceptable to use to assert an identity. For example, a combined value 160 that is greater than the threshold value 164 may be deemed unsuitable for assertion of identity, and may be discarded from further consideration.

By creating a combined value 160 from a set of distance data 146, the system 100 is tolerant to variations in the quality of the input image data 112 while attempting to determine the identity data 152. For example, if a single finger is poorly lit in the input image data 112, or a bandage obscures a portion of the palm, jewelry has been added or removed since enrollment, and so forth, the system 100 is still able to operate. As described next, if the combined value 160 satisfies the specified thresholds, identity may be asserted.

The comparator module 162 may determine a lowest combined value 160. For example, the set of combined values 160(1)-(Q) provided to the comparator module 162 may be sorted into a list in ascending order. The lowest combined value 160 that is present in the first position of the list may be compared to the threshold value 164. If the lowest combined value 160 is less than the threshold value 164, the identity data 152 that is associated with that combined value 160 may be asserted as the identity of the queried user. For example:

TABLE 1

| Combined Value 160 (ascending sort) | Rank (of sorted list) | Identity Data 152 |
|---|---|---|
| 397 | 1 | Alice |
| 439 | 2 | Bob |
| 593 | 3 | Chloe |

Continuing the example, the threshold value 164 may have a value of 450. The combined values 160 for "Alice" and "Bob" are less than the threshold value 164, and are eligible for consideration to assert identity. "Chloe" is excluded from further consideration as the combined value 160 is greater than the threshold value 164. The combined value 160 associated with "Alice" is the lowest combined value 160, and so the identity data 152 of "Alice" is asserted to the user who presented their hand 102 to the scanner 104.

In other implementations, the comparator module 162 may perform other operations. For example, the comparator module 162 may incorporate additional analysis to combined values 160 that are deemed to be relatively close. For example, if the difference in combined value 160 between the first ranked (lowest) combined value 160(1) and the second ranked (next lowest) combined value 160(2) is less than a second threshold value 164, one or more actions may be initiated. These actions may include one or more of additional analysis, reporting an error, notifying an operator, and so forth.

Use of the combination module 148 to determine the combined value 160 provides substantial improvements in accuracy as well as reductions in operating latency. The ability to process data from different portions of the hand in different modalities using different embedding models allows for greater consideration of finer-grained features. The reduction of comparisons to distance data 146 in respective embedding spaces 230 allows for computationally efficient comparisons of these finer-grained features. The operation of the combination module 148 further reduces latency in operation by allowing rapid and computationally efficient aggregation of a set of values in the distance data 146 into a single combined value 160. Likewise, the single combined value 160 that is associated with each candidate facilitates rapid comparisons and determination of the identity (if any) to be asserted.

The system 100 allows for modular operation, facilitating ongoing operations by allowing for changes or upgrades to various portions without affecting the overall system architecture. For example, an embedding model module 140 may be updated or replaced with an upgraded version without requiring changes to the remainder of the system 100. In another example, additional portions and corresponding embedding model modules 140 may be added at a later date. For example, at a later date image data of a back of a user's hand may be incorporated into operation of the system 100.

The modular operation also facilitates parallel processing techniques, allowing further reduction in latency during operation. For example, the determination of the distance data 146 and combined values 160 for a plurality of candidates may be performed simultaneously, reducing latency, with the resulting combined values 160 assessed.

Figure 5:
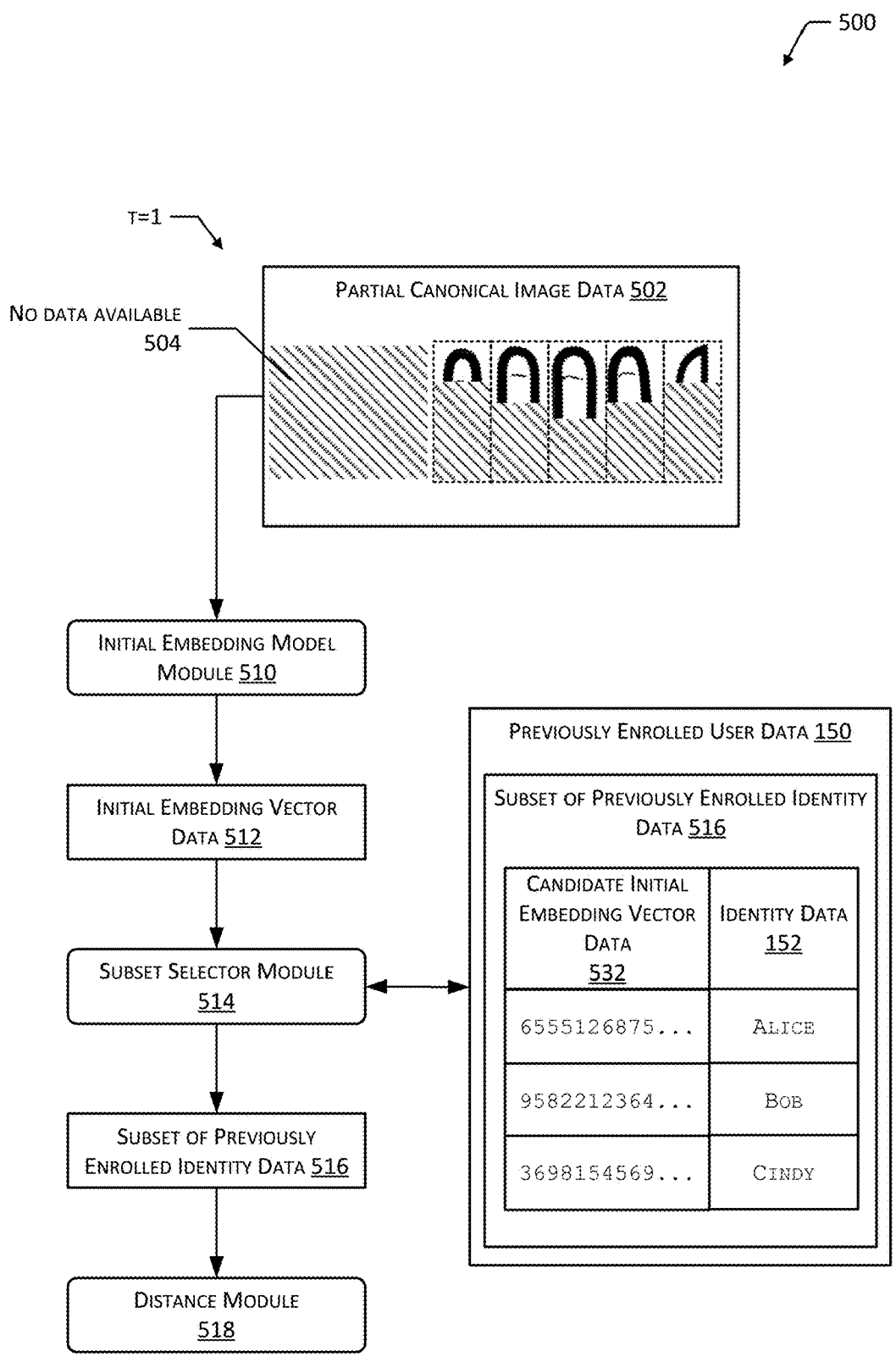
FIG. 5 depicts use of initial images of the user's hand to determine a subset of previously enrolled identities, according to some implementations.

FIG. 5 depicts at 500 use of initial images of the user's hand 102 to determine a subset of previously enrolled identities, according to some implementations. During operation of the scanner 104, the input image data 112 may comprise a set of images that depict the hand 102 moving into the FOV 110. Images acquired at a first time may depict fingertips as the fingers of the hand 102 enter the FOV 110. At a second time, more of the fingers are visible, at a third time the palm is visible, and so forth.

In some implementations, the system 100 may use these initial images of the hand 102 to determine a subset of candidate identities that are to be assessed as described above. Partial canonical image data 502 is depicted in FIG. 5 that was acquired at time t=1 where the fingertips of the hand 102 had entered the FOV 110 but the rest of the hand 102 has not yet. The partial canonical image data 502 is determined based on the input image data 112 available. The partial canonical image data 502 may include one or more of first modality or second modality image data.

Because the remainder of the fingers and the palm have not yet entered the FOV 110 at t=1, the partial canonical image data 502 includes portions with no data available 504. The partial canonical image data 502 may not contain sufficient information to assert an identity, but may be used to determine a subset of candidates that reduces the search space and reduces latency and improves efficiency of the system.

At 510 an initial embedding model module 510 processes the partial canonical image data 502 and determines initial embedding vector data 512. The initial embedding vector data 512 is provided to a subset selector module 514. The subset selector module 514 may access the previously enrolled user data 150 and the initial embedding vector data 512 to determine a subset of previously enrolled identity data 516. In the implementation shown in FIG. 5, the previously enrolled user data 150 may include candidate initial embedding vector data 532 that is associated with the identity data 152. For example, during enrollment the input image data 112 provided by the user who is enrolling may be processed to determine the candidate initial embedding vector data 532.

The subset selector module 514 may utilize one or more techniques to determine the subset of previously enrolled identity data 516. For example, the initial embedding vector data 512 may be used to determine a point in the initial embedding vector space. The subset selector module 514 may determine the subset of previously enrolled identity data 516 as those initial candidate embedding vectors that are within a threshold distance of that point. In another implementation, various volumes within the initial embedding vector space may be predefined. The initial embedding vector data 512 may be used to select one of these volumes. The subset of previously enrolled identity data 516 may comprise the identity data 152 that is associated with the selected volume.

The subset of previously enrolled identity data 516 may then be provided to the distance module 518. The distance module 518 may then proceed to determine the distance data 146 based on the candidate embedding vector data 154 as described herein.

The subset selector module 514 may use other information as well to determine the subset of previously enrolled identity data 516. In some implementations, geographic information, historical usage, data from mobile devices, and so forth may be used instead of, or in addition to, the initial embedding vector data 512. For example, the subset selector module 514 may compare the initial embedding vector data 512 with the candidate initial embedding vectors 532 that are associated with enrolled users who live in the country where the scanner 104 is located.

Figure 6:
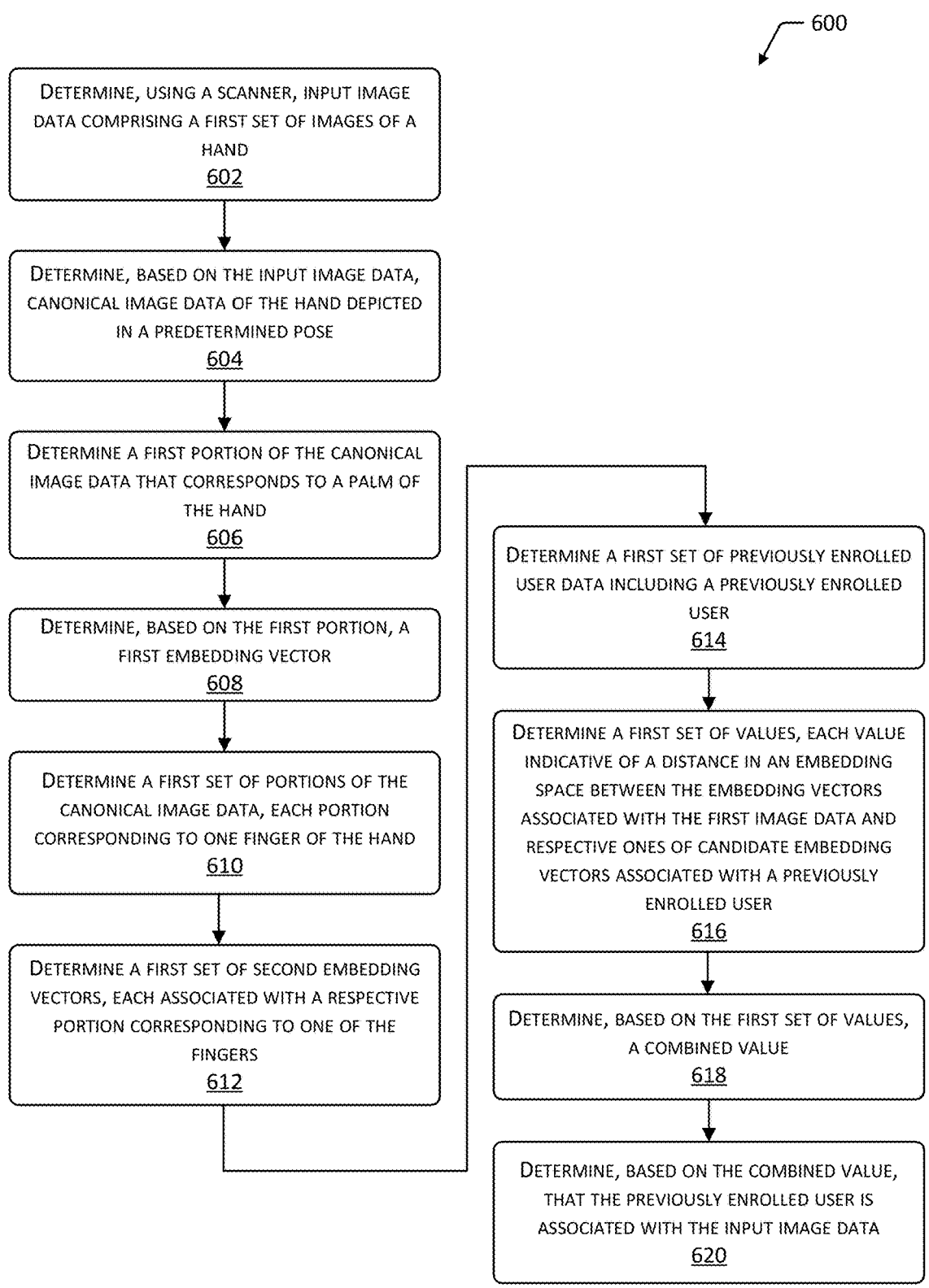
FIG. 6 is a flow diagram of a process to identify a user based on distance data, according to some implementations.

FIG. 6 is a flow diagram 600 of a process to identify a user based on distance data 146, according to some implementations. The process may be implemented at least in part by executing instructions on one or more of a processor of the computing device 106 within the scanner 104, on another computing device such as a server or group of servers accessible via a network, or a combination thereof.

At 602, input image data 112 is determined that comprises a first set of images of at least a portion of a hand 102. For example, the scanner 104 acquires first modality image data 114, second modality image data 116, and so forth.

At 604, based on the input image data 112, canonical image data 130 of the hand 102 depicted in a predetermined pose is determined. This canonical image data 130 may include or be indicative of the first and second modalities acquired by the scanner 104.

In some implementations, the process may utilize the input image data 112 or non-canonical images derived therefrom, omitting the use of the canonical image data 130. For example, the filter module 122 may apply one or more filters to the input image data 112, and the resulting filtered data may be subsequently processed. In one implementation, the individual embedding model modules 140 may be trained to operate on their respective particular portion of interest of a non-canonical input image, disregarding other portions. For example, the embedding model module 140 associated with a palm portion may be trained to recognize and operate on a portion of the non-canonical input image that corresponds to the palm. In another implementation, the input image data 112 may be constrained such that the input image data 112 already depicts an equivalent canonical image. For example, the input image data 112 of a hand 102 may be acquired at a specified distance and specified pose relative to the scanner 104.

At 606, a first portion of the canonical image data 130 that corresponds to a palm of the hand 102 is determined. For example, the canonical image module 124 may determine the first query canonical portion image data 310 and the second query canonical portion image data 312. Continuing the example, the first portion may comprise the portion of one or more of the first query canonical portion image data 310 and the second query canonical portion image data 312 that are associated with the palm. In other implementations, non-canonical images may be processed to determine the first portion.

At 608, based at least on the first portion, a first embedding vector is determined. For example, the embedding model module 140(1) may process the portion of the first query canonical portion image data 310 and determine the (query) embedding vector data 142(1). Similarly, the first portion of the second query canonical portion image data 312 may be processed by the embedding model module 140(7) to determine the (query) embedding vector data 142(7).

At 610 a first set of portions of the canonical image data 130 is determined, each portion corresponding to one finger of the hand 102. For example, the various portions shown in the first query canonical portion image data 310 and the second query canonical portion image data 312 that correspond to fingers are determined. In other implementations, non-canonical images may be processed to determine the first set of portions.

At 612 a first set of second embedding vectors are determined, each associated with a respective portion corresponding to one of the fingers. For example, the first set of second embedding vectors may comprise the (query) embedding vector data 142(2)-(6) determined by processing the first query canonical portion image data 310 and the (query) embedding vector data 142(7)-(12) determined by processing the second query canonical portion image data 312.

At 614 a first set of previously enrolled user data 150 is determined that includes a previously enrolled user. For example, the previously enrolled user may have opted in during an enrollment process. During the enrollment process input image data 112 may have been obtained and processed to determine candidate embedding vector data 154.

At 616 a first set of values are determined, each value indicative of a distance in an embedding space between the embedding vectors associated with the first image data and respective ones of candidate embedding vectors associated with a previously enrolled user. For example, the first set of values may comprise the distance data 146, including the first modality distance data 320 and the second modality distance data 322.

At 618, based on the first set of values, a combined value 160 is determined. For example, the distance data 146 is processed by the combination module 148 to determine the combined value 160 that is indicative of similarity between the query input image data 112 of the hand 102 of the user and the previously enrolled user data 150.

At 620, based on the combined value 160, a determination is made as to whether the previously enrolled user is associated with the input image data 112. As described above, the comparator module 162 may determine the combined value 160 with the lowest value that also has a value less than a threshold value 164. The identity data 152 associated with this combined value 160 may be asserted to the user who presented the hand 102.

In some implementations, once the identity data 152 has been asserted, at least a portion of the information acquired may be used to update the previously enrolled user data 150. For example, the previously enrolled user data 150 may be updated with additional input image data 112, updated candidate embedding vector data 154, and so forth. This allows the system 100 to respond to changes associated with the user. For example, if the user begins wearing more jewelry, their previously enrolled user data 150 would be updated accordingly.

In one implementation, the update to previously enrolled user data 150 may be limited based on factors such as the combined value 160, frequency of occurrence, span of time, and so forth. In one implementation, the combined value 160 may need to be less than a third threshold for an update to the previously enrolled user data 150 to be stored. In another implementation, the input image data 112 may be temporarily retained, and if the same features appear across more than a threshold number of identification sessions over a specified number of days or weeks, the update to the previously enrolled user data 150 may be permitted. In yet another implementation, the user may receive a notification or prompt indicating a detected change. The user may then provide approval to allow the detected change to be committed to their respective previously enrolled user data 150. This notification or prompt may be provided via a separate communication channel that provides multifactor authentication. For example, the user may receive a confirmation message on their smartphone that has been associated with their identity data 152 during enrollment.

Figure 7:
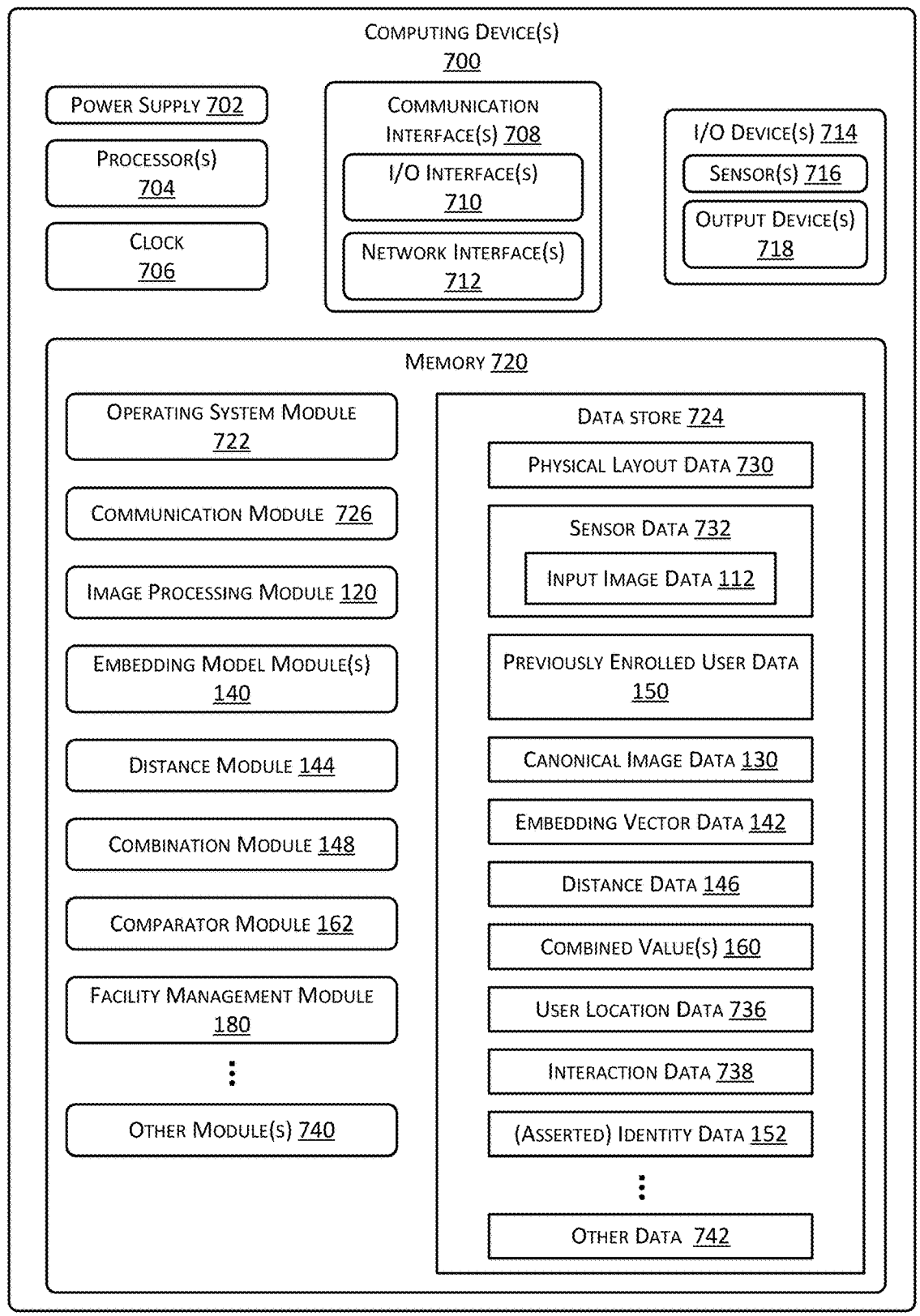
FIG. 7 is a block diagram of a computing device to identify a user, according to some implementations.

FIG. 7 is a block diagram 700 of a computing device to identify a user, according to some implementations. The computing device 700 may be within the scanner 104, may comprise a server, and so forth. The computing device 700 may be physically present at the facility, may be accessible by a network, or a combination of both. The computing device 700 does not require end-user knowledge of the physical location and configuration of the system that delivers the services. Common expressions associated with the computing device 700 may include "embedded system", "on-demand computing", "software as a service (SaaS)", "platform computing", "network-accessible platform", "cloud services", "data centers", and so forth. Services provided by the computing device 700 may be distributed across one or more physical or virtual devices.

One or more power supplies 702 may be configured to provide electrical power suitable for operating the components in the computing device 700. The one or more power supplies 702 may comprise batteries, capacitors, fuel cells, photovoltaic cells, wireless power receivers, conductive couplings suitable for attachment to a power source such as provided by an electric utility, and so forth. The computing device 700 may include one or more hardware processors 704 (processors) configured to execute one or more stored instructions. The processors 704 may comprise one or more cores. One or more clocks 706 may provide information indicative of date, time, ticks, and so forth. For example, the processor 704 may use data from the clock 706 to associate a particular interaction with a particular point in time.

The computing device 700 may include one or more communication interfaces 708 such as input/output (I/O) interfaces 710, network interfaces 712, and so forth. The communication interfaces 708 enable the computing device 700, or components thereof, to communicate with other devices or components. The communication interfaces 708 may include one or more I/O interfaces 710. The I/O interfaces 710 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 710 may couple to one or more I/O devices 714. The I/O devices 714 may include input devices such as one or more of a sensor 716, keyboard, mouse, scanner, and so forth. The I/O devices 714 may also include output devices 718 such as one or more of a display device, printer, audio speakers, and so forth. In some embodiments, the I/O devices 714 may be physically incorporated with the computing device 700 or may be externally placed.

The network interfaces 712 may be configured to provide communications between the computing device 700 and other devices, such as routers, access points, and so forth. The network interfaces 712 may include devices configured to couple to personal area networks (PANS), local area networks (LANs), wireless local area networks (WLANS), wide area networks (WANs), and so forth. For example, the network interfaces 712 may include devices compatible with Ethernet, Wi-Fi, Bluetooth, and so forth.

The computing device 700 may also include one or more buses or other internal communications hardware or software that allow for the transfer of data between the various modules and components of the computing device 700.

As shown in FIG. 7, the computing device 700 includes one or more memories 720. The memory 720 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 720 provides storage of computer-readable instructions, data structures, program modules, and other data for the operation of the computing device 700. A few example functional modules are shown stored in the memory 720, although the same functionality may alternatively be implemented in hardware, firmware, or as a system on a chip (SoC).

The memory 720 may include at least one operating system (OS) module 722. The OS module 722 is configured to manage hardware resource devices such as the I/O interfaces 710, the I/O devices 714, the communication interfaces 708, and provide various services to applications or modules executing on the processors 704. The OS module 722 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 720 may be a data store 724 and one or more of the following modules. These modules may be executed as foreground applications, background tasks, daemons, and so forth. The data store 724 may use a flat file, database, linked list, tree, executable code, script, or other data structure to store information. In some implementations, the data store 724 or a portion of the data store 724 may be distributed across one or more other devices including the computing devices 700, network attached storage devices, and so forth.

The data store 724 may store one or more of the previously enrolled user data 150, the canonical image data 130, the distance data 146, the combined value(s) 160, and so forth.

The memory 720 may store the image processing module 120, the embedding model modules 140, the distance module 144, the combination module 148, the comparator module 162, and so forth.

A communication module 726 may be configured to establish communications with the computing device 106, servers, or other computing devices 700, or other devices. The communications may be authenticated, encrypted, and so forth.

The memory 720 may store the facility management module 180. The facility management module 180 may perform various functions, such as tracking items between different inventory locations, to and from carts, generating restocking orders, directing operation of robots within the facility, using the (asserted) identity data 152 to associate a particular user identity with a user in the facility, and so forth. During operation, the facility management module 180 may access sensor data 732 such as input image data 112, or data from other sensors.

Information used by the facility management module 180 may be stored in the data store 724. For example, the data store 724 may be used to store physical layout data 730, sensor data 732, (asserted) identity data 152, user location data 736, interaction data 738, and so forth.

The physical layout data 730 may provide information indicative of where scanners 104, cameras, weight sensors, antennas for radio receivers, inventory locations, and so forth are in the facility with respect to one another. For example, the physical layout data 730 may comprise information representative of a map or floor plan of the facility with relative positions of gates with scanners 104 and inventory locations.

The facility management module 180 may generate the user location data 736 that is indicative of the location of the user within the facility. For example, the facility management module 180 may use image data obtained by the cameras to determine a location of the user. In other implementations, other techniques may be used for determining the user location data 736. For example, data from a smart floor may be used to determine the location of the user.

Identity data 152 may be associated with user location data 736. For example, the user enters the facility and has their hand 102 scanned by the scanner 104, resulting in (asserted) identity data 152 that is indicative of their time of entry and the scanner 104 associated with where they entered. The location data indicative of a path of a user that begins at the scanner 104 at the time of entry may be associated with the user identifier in the (asserted) identity data 152.

Based on the user location data 736 and the interaction data 738, a particular interaction may be associated with an account of a particular user. For example, if the user location data 736 indicates that the user is present in front of inventory location 492 at time 17:47:20 and the interaction data 738 indicates a pick of a quantity of one item from an area on inventory location 492 at 17:47:27, the user may be billed for that pick.

The facility management module 180 may use the sensor data 732 to generate the interaction data 738. The interaction data 738 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 180 may generate interaction data 738 that indicates what item the user picked from a particular lane on a shelf, and then use this interaction data 738 to adjust the count of inventory stowed at that lane. The interaction data 738 may then be used to bill an account associated with the user identifier that is associated with the user who picked the item.

The facility management module 180 may process the sensor data 732 and generate output data. For example, based on the interaction data 738, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 740 may also be present in the memory 720 as well as other data 742 in the data store 724. For example, a billing module may use the interaction data 738 and the (asserted) identity data 152 to bill an account associated with a particular user.

The devices and techniques described in this disclosure may be used in a variety of other settings. For example, the system may be used in conjunction with a point-of-sale (POS) device. The user may present their hand 102 to a scanner 104 to provide an indication of intent and authorization to pay with an account associated with the (asserted) identity data 152. In another example, a robot may incorporate a scanner 104. The robot may use the (asserted) identity data 152 to determine whether to deliver a parcel to the user, and based on the (asserted) identity data 152, which parcel to deliver.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a camera;
   a memory, storing first computer-executable instructions; and
   a hardware processor to execute the first computer-executable instructions to:
   acquire a first set of images of a hand using the camera;
   determine a first canonical image depicting a palm of the hand and one or more fingers, wherein the first canonical image depicts the hand in a predetermined pose;
   determine a first portion of the first canonical image that corresponds to the palm;

determine, based on the first portion, a first embedding vector;

determine a second portion of the first canonical image that corresponds to a first finger;

determine, based on the second portion, a second embedding vector;

determine a first candidate embedding vector associated with a first enrolled user identity, wherein the first candidate embedding vector is representative of a palm of a first enrolled user;

determine a second candidate embedding vector associated with a second enrolled user identity, wherein the second candidate embedding vector is representative of a palm of a second enrolled user;

determine a third candidate embedding vector associated with the first enrolled user identity, wherein the third candidate embedding vector is representative of a first finger of the first enrolled user;

determine a fourth candidate embedding vector associated with the second enrolled user identity, wherein the fourth candidate embedding vector is representative of a first finger of the second enrolled user;

determine a first distance in a first embedding space between the first embedding vector and the first candidate embedding vector;

determine a second distance in a second embedding space between the second embedding vector and the third candidate embedding vector;

determine a third distance by multiplying the first distance by the second distance;

determine a fourth distance in the first embedding space between the first embedding vector and the second candidate embedding vector;

determine a fifth distance in the second embedding space between the second embedding vector and the fourth candidate embedding vector;

determine a sixth distance by multiplying the fourth distance by the fifth distance; and based on the third distance being less than the sixth distance, determine the first set of images are associated with the first enrolled user.

2. The system of claim 1, the camera comprising a first polarizer and a second polarizer; and
wherein the first set of images comprise:
a first image acquired using incoming light passing through the first polarizer, and
a second image acquired using incoming light passing through the second polarizer.

3. A method comprising:
determining a first image;
determining a first portion of the first image that corresponds to a palm of a hand depicted in the first image;
determining, based on the first portion, a first embedding vector using a first embedding model;
determining a second portion of the first image that corresponds to a first finger of the hand depicted in the first image;
determining, based on the second portion, a second embedding vector using a second embedding model, wherein the second embedding model is different than the first embedding model;
determining a first set of values, wherein each value is based at least in part on:
a first distance in a first embedding space between the first embedding vector and a candidate palm embedding vector that is associated with a previously enrolled user, and
a second distance between the second embedding vector and a candidate first finger embedding vector that is associated with a first finger of the previously enrolled user; and
determining, based on the first set of values, that the first image is associated with the previously enrolled user.

4. The method of claim 3, the determining each value of the first set of values comprising calculating a product of: the first distance and the second distance.

5. The method of claim 3, the determining the first image comprising one or more of:
acquiring the first image using light that has passed through a first polarizer to reach a camera; or
acquiring the first image using light that has passed through a second polarizer to reach the camera.

6. The method of claim 3, further comprising:
determining a third portion of the first image that corresponds to a second finger of the hand depicted in the first image; and
determining, using a third embedding model that is associated with the second finger, a third embedding vector that is associated with the third portion;
wherein each value of the first set of values is further based at least in part on:
a third distance between the third embedding vector and a candidate second finger embedding vector that is associated with a second finger of the previously enrolled user.

7. The method of claim 3, further comprising:
acquiring a second image at a first time, wherein the second image depicts at least a portion of one or more fingers of the hand;
determining, based on the second image, a first set of previously enrolled users that includes the previously enrolled user, wherein the first set of previously enrolled users is a subset of a second set of previously enrolled users; and
wherein the first set of values are associated with the first set of previously enrolled users.

8. The method of claim 3, further comprising:
acquiring a first set of images using a camera, wherein the first set of images comprises a second image;
determining one or more characteristics of the second image; and
based on the one or more characteristics, determining the first image based on the second image, wherein the first image depicts the hand in a predetermined pose.

9. The method of claim 3, determining each value in the first set of values comprising:
determining a first weight that is associated with the first distance;
multiplying the first distance and the first weight;
determining a second weight that is associated with the second distance; and
multiplying the second distance and the second weight.

10. A method comprising:
determining a first set of images depicting at least a portion of a hand, wherein the first set of images are acquired using a plurality of modalities;
determining, based on two or more portions of the first set of images, a first set of embedding vectors using a plurality of embedding models, wherein each portion uses a different embedding model;
determining a second set of embedding vectors associated with previously enrolled users;

determining, based on the two or more portions of the first set of images, a first set of values, wherein each value is based at least in part on:
  a plurality of distances in one or more embedding spaces between the first set of embedding vectors and the second set of embedding vectors that are associated with one of the previously enrolled users; and
determining, based on the first set of values, that one of the previously enrolled users is associated with the first set of images.

11. The method of claim 10, further comprising:
determining each of the values in the first set of values by multiplying the plurality of distances associated with a same one of the previously enrolled users.

12. The method of claim 10, wherein the plurality of modalities comprises:
  a first modality comprising images of surface features;
  a second modality comprising images including subcutaneous features; and
  wherein the first set of embedding vectors and the second set of embedding vectors are based on the first modality and the second modality.

13. The method of claim 10, the first set of embedding vectors comprising:
  a first palm embedding vector associated with a palm of the hand,
  a first finger embedding vector associated with a first finger of the hand,
  a second finger embedding vector associated with a second finger of the hand,
  a third finger embedding vector associated with a third finger of the hand,
  a fourth finger embedding vector associated with a fourth finger of the hand, and
  a fifth finger embedding vector associated with a fifth finger of the hand;
    the second set of embedding vectors comprising:
  a second palm embedding vector associated with a palm of a hand of a first enrolled user of the previously enrolled users,
  a sixth finger embedding vector associated with a first finger of the hand of the first enrolled user,
  a seventh finger embedding vector associated with a second finger of the hand of the first enrolled user,
  an eighth finger embedding vector associated with a third finger of the hand of the first enrolled user,
  a ninth finger embedding vector associated with a fourth finger of the hand of the first enrolled user, and
  a tenth finger embedding vector associated with a fifth finger of the hand of the first enrolled user; and
    determining the first palm embedding vector and the second palm embedding vector using a first embedding model; and
    determining the first through tenth finger embedding vectors using a second embedding model.

14. The method of claim 10, the first set of embedding vectors comprising:
  a first palm embedding vector associated with a palm of the hand,
  a first finger embedding vector associated with a first finger of the hand, and
  a second finger embedding vector associated with a second finger of the hand,
    the second set of embedding vectors comprising:
  a second palm embedding vector associated with a palm of a hand of a first enrolled user,
  a third finger embedding vector associated with a first finger of the hand of the first enrolled user, and
  a fourth finger embedding vector associated with a second finger of the hand of the first enrolled user;
    determining the first palm embedding vector and the second palm embedding vector using a first embedding model;
    determining the first and the third finger embedding vectors using a second embedding model; and
    determining the second and the fourth finger embedding vectors using a third embedding model.

15. The method of claim 10, the first set of images comprising:
  a first image acquired at a first time, wherein the first image depicts at least a portion of one or more fingers of the hand;
  a second image acquired at a second time, wherein the second image depicts at least a portion of a palm of the hand;
  determining, based on the first image, a first set of previously enrolled users that includes the one of the previously enrolled users, wherein the first set of previously enrolled users is a subset of a second set of previously enrolled users; and
  wherein the second set of embedding vectors are associated with the first set of previously enrolled users.

16. The method of claim 10, the determining the first set of images comprising:
  acquiring a first image using a camera;
  determining one or more characteristics of the first image; and
  based on the one or more characteristics, including the first image in the first set of images.

17. The method of claim 10, the determining the first set of images comprising:
  acquiring a first image using a camera;
  determining one or more characteristics of the first image; and
  based on the one or more characteristics, discarding the first image from the first set of images.

18. The method of claim 10, further comprising:
  determining, based on at least a portion of the first set of images, a first canonical image depicting the hand in a predetermined pose;
  the determining the first set of embedding vectors comprising processing the first canonical image; and
  the determining the second set of embedding vectors comprising processing canonical images associated with the previously enrolled users.

19. The method of claim 10, the determining each value in the first set of values comprising:
  determining a first weight that is associated with a first distance in the plurality of distances;
  multiplying the first distance and the first weight to determine a first intermediate distance;
  determining a second weight that is associated with a second distance in the plurality of distances;
  multiplying the second distance and the second weight to determine a second intermediate distance; and
  multiplying the first intermediate distance and the second intermediate distance.

20. The method of claim 10, further comprising:
  determining a third portion of the first set of images that corresponds to a second finger of the hand depicted in the first set of images; and determining, using a third embedding model that is associated with the second finger, a third embedding vector that is associated with the third portion.

\* \* \* \* \*